(12) United States Patent
Muniraju et al.

(10) Patent No.: US 7,515,019 B2
(45) Date of Patent: Apr. 7, 2009

(54) NON-CONTACT POSITION SENSOR WITH SONIC WAVEGUIDE

(75) Inventors: Raghavendra Muniraju, Bangalore (IN); Saravanan Sadasivan, Bangalore (IN); Raviprakash Thotadakumbri, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 291 days.

(21) Appl. No.: 11/314,340

(22) Filed: Dec. 20, 2005

(65) Prior Publication Data

US 2007/0139137 A1 Jun. 21, 2007

(51) Int. Cl.
*H03H 9/00* (2006.01)
*H04B 11/00* (2006.01)
*H01P 3/02* (2006.01)
*H01P 1/11* (2006.01)

(52) U.S. Cl. .................. 333/141; 333/148; 333/158
(58) Field of Classification Search ............ 333/141, 333/148, 149, 157, 158
See application file for complete search history.

(56) References Cited

U.S. PATENT DOCUMENTS

| | | | | |
|---|---|---|---|---|
| 3,898,555 A * | 8/1975 | Tellerman | ............... | 324/207.13 |
| 4,939,457 A | 7/1990 | Tellerman | ............... | 324/207.13 |
| 5,406,200 A * | 4/1995 | Begin et al. | ............. | 324/207.13 |
| 5,589,769 A | 12/1996 | Krahn | ................... | 324/207.26 |
| 5,717,330 A * | 2/1998 | Moreau et al. | ......... | 324/207.13 |
| 5,982,297 A * | 11/1999 | Welle | .................... | 340/870.16 |
| 5,998,992 A * | 12/1999 | Arai | ...................... | 324/207.13 |
| 2004/0208473 A1* | 10/2004 | Topmiller | .................. | 385/147 |

OTHER PUBLICATIONS

Hristoforou, E.; Niarchos, D., "Fast characterisation of magnetostrictive delay lines," Magnetics, IEEE Transactions on , vol. 29, No. 6, pp. 3147-3149, Nov. 1993.*
Hristoforou, E.; Chiriac, H.; Neagu, M., "A new magnetic field sensor based on magnetostrictive delay lines ," Instrumentation and Measurement, IEEE Transactions on , vol. 46, No. 2, pp. 632-635, Apr. 1997.*
D. Nyce, *Magnetostrictive Linear Position Sensors*, MTS Systems Corp.

* cited by examiner

*Primary Examiner*—Dean O Takaoka
(74) *Attorney, Agent, or Firm*—Kermit D. Lopez; Luis M. Ortiz

(57) ABSTRACT

An apparatus and method for measuring the position of a member. The apparatus has a sonic waveguide, a generator for generating an interrogation sonic wave at a first position in the sonic wave guide, and a transducer for converting the interrogation sonic wave, at a second position in the sonic wave guide, to an interrogation signal. A timer can be enabled in response to the generator generating the interrogation sonic wave and stopped in response to the transducer converting the interrogation sonic wave so as to determine the propagation time delay of the interrogation sonic wave and the distance between the first and second positions. When the transducer is attached to a member, the position of the member can be determined from this distance. The apparatus can include a transmitter for transmitting the interrogation signal. The generator can be configured to generate an excitation sonic wave which is converted by the transducer to a power signal for powering the transmitter.

18 Claims, 6 Drawing Sheets

NON-CONTACT POSITION SENSOR WITH SONIC WAVEGUIDE

TECHNICAL FIELD

Embodiments are generally related to measurement apparatus and, more particularly, to apparatus and methods for measuring the position of a member or medium. Additionally, embodiments are related to sonic delay lines for sensing the linear position of a member and methods of sensing associated therewith.

BACKGROUND

Contact type linear position sensors for measuring the position of members, such as for example, potentiometer based position sensors in which a wiper brushes over the surface of a resistive element, suffer from a variety of drawbacks including a reduced product life, sensitivity to vibration, significant hysteresis and non-linearity, short operating lengths and difficulty in measuring the position of members moving at high speed, such for example high stroke speed pistons.

Non-contact type position sensors are advantageous for making position measurements because position changes of the member can be made without causing wear and tear of the sensor parts unlike contact sensors. However, known non-contact linear positions sensor employed in industrial motion control and other applications for measuring the position of cylinders, pistons, bearings and other members are complex in design and costly to produce. For example the position detection apparatus disclosed in U.S. Pat. No. 5,589,769 entitled "Position Detection apparatus including a circuit for receiving a plurality of output signal values and fitting the output signal values to a curve", issued to Krahn on Dec. 31, 1996, requires employing an array of magnetic field transducers to sense a magnet position and electronic circuitry to fit the output signals from the transducers to a curve having a cross over point to determine the magnet position. In such position sensors, electronic complexity is dependent on the measuring length. Furthermore, such sensor systems are susceptible to stray magnetic fields and necessitate application of complex algorithms, in the associated signal conditioning circuitry. Additionally, the sensor system requires high power consumption and has a response time which is limited by the sampling of the sensing array for signal conditioning.

There is a continuing need to provide non contact low cost apparatus for effectively measuring the position of a member.

The embodiments disclosed herein therefore directly address the shortcomings of present position sensors providing a low cost apparatus for measuring the linear position of a member that can be integrated more effectively into existing applications.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

It is, therefore, one aspect of the present invention to provide for an improved apparatus for measuring the position of a member.

It is another aspect of the present invention to provide for an improved method of measuring the position of a member.

It is a further aspect of the present invention to provide for a low cost apparatus for measuring the position of a member.

It is an additional aspect of the present invention to provide for an apparatus for measuring the position of a member which can be more easily integrated into existing applications It is yet another aspect of the present invention to provide for a sonic delay line for use in measuring the position of a member.

The aforementioned aspects of the invention and other objectives and advantages can now be achieved as described herein. According to one aspect, a sonic delay line for measuring the distance between positions on a sonic wave guide has a generator, operatively coupled to the sonic wave guide, for generating one or more sonic waves at a first position, and transducer, also operatively coupled to the sonic wave guide, for converting the sonic waves(s) at a second position into one or more output signals.

Sonic wave(s), generated at the first position by the generator, propagate through the sonic wave guide and are converted at the second position by the transducer after a time delay representing the distance between the first and second positions.

Advantageously, the sonic delay line is of low cost and unsusceptible to wear & tear as the transducer is operable without contacting the sonic waveguide so that the sonic delay line has a long operating life. Furthermore, the displacement range of the sonic delay line is long and the response time is low allowing for measurement of the position of fast moving members, such as pistons with fast stroke speeds. The sonic delay line is less complex and exhibits low hysteresis and high signal to noise ratio (SNR) than existing positions sensors.

The generator can be an actuator, such as for example a piezo-electric actuator, coupled to a distal end of the sonic wave guide. The transducer can be a biasing magnetic source and coil. The oil assembly can acts as a pick-up for applying a magnetic field to the sonic wave guide at the second position and a coil for detecting a change in magnetic flux density at the second position caused by the sonic wave(s). Utilizing a piezo-electric actuator permits generation of the sonicwaves in a simple manner without providing additional current pulses in the sonicwave guide so that the sonic wave line can be made more compact and at a lower cost.

The propagation time delay can be determined by a timer, operatively coupled to the generator and transducer, which is configured to be enabled in response to the generator generating the sonic wave(s) and stopped in response to the transducer converting the sonic wave(s). The sonic wave can be an interrogation sonic wave which can be converted by the transducer to an interrogation signal.

According to another aspect, an apparatus for measuring the position of a member has a sonic delay line of the aforementioned type.

When the member is attached or aligned to the transducer the position of member can be determined from a measurement of the time delay between generating the sonic wave(s) at the first position and detecting said sonic wave(s) at the second position. The position of the member, such as for example a movable piston, can be measured by aligning the member with the second position, for example, by attaching the transducer to the member. In the case of a piston, the second position is changeable by the reciprocating motion of the piston and transducer attached thereto.

Preferably, the apparatus includes a transmitter, attachable to the member with the transducer, for transmitting the transducer interrogation signal.

The generator can be configured to generate excitation sonic waves, in addition to interrogation sonic waves, and the transducer can be configured to convert the excitation sonic waves into electrical power for powering an electronic device. For example, the transmitter can be powered by this electrical power to transmit the transducer interrogation signal.

Advantageously, the excitation sonic waves are converted to electrical power for powering an electronic device, such as the transmitter, so that the device is effectively self-powered, without the need of local batteries or an external power supply.

A receiver can be arranged to receive the transmitted interrogation signal. Furthermore, the timer can be operatively coupled to the generator and receiver so that the timer can be enabled in response to the generator generating the interrogation sonic wave and stopped in response to the receiver detecting the transmitted interrogation signal.

The transmitter and receiver enable the interrogation signal to be wireless communicated to the signal conditioning circuitry so that hardware connections between the transducer and the conditioning circuitry are avoided. This is particularly useful applications in which the member whose position is being measured is moving at speed, like for example a piston, where hardwiring connections between the transducer and conditioning circuitry can be problematic also in applications of harsh environment such as those involving high temperatures.

According to yet another aspect, a method for measuring the position of a member comprises aligning a member to a first position or second position on a sonic wave guide, generating an interrogation sonic wave, propagating the interrogation sonic wave through the sonic wave guide from the first position to the second position, detecting at least one sonic wave at the second position, and determining the time delay between generating and detecting the sonic wave(s), and determining the position of the member from the time delay.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
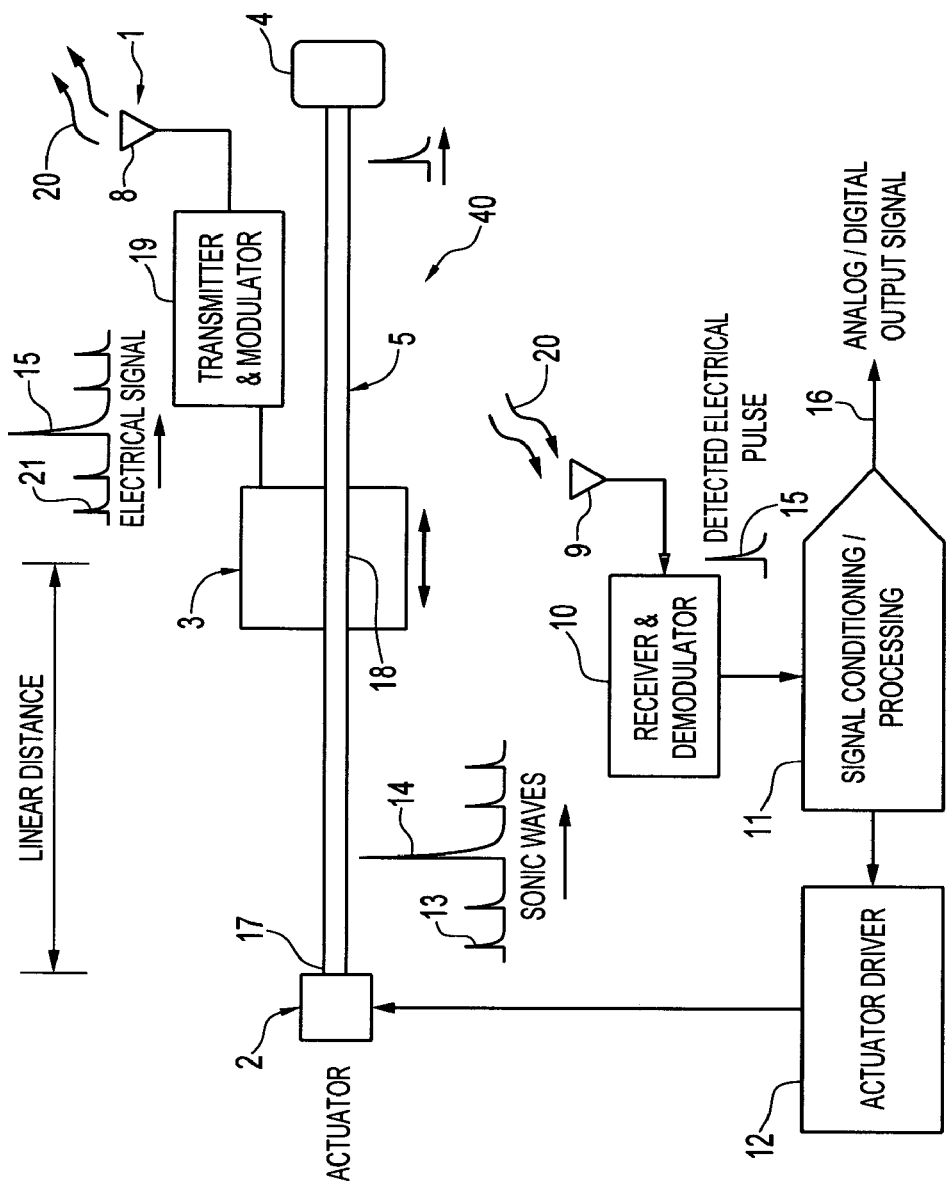
FIG. 1 illustrates block diagram of an apparatus for measuring the position of a member according to a preferred embodiment.

Referring to FIG. 1 of the accompanying drawings, which illustrates a block diagram of an apparatus for measuring the position of a member according to one embodiment, the apparatus 1 has a sonic wave actuator or generator 2, operatively coupled to a sonic wave guide 5 for generating sonic waves 13, 14 at a first position 17, and a non-contact transducer 3, operatively coupled to the sonic wave guide, for converting the sonic waves 13, 14 at a second position 18 into electrical signals. Generator 2, wave guide 5 and transducer 3 collectively form a sonic delay line 40.

The sonic waves 13,14 travel mechanically in the waveguide away from the first position 17 to the second position 18 with a propagation velocity which is determined by the waveguide material so that the time delay between generating and detecting the sonic waves 13, 14 at the first and second positions 17, 18, respectively, represents the distance between the first and second positions. This distance can be determined by measuring the time delay and multiplying it by the propagation velocity of the sonic waves in the waveguide material.

The position of a member (not shown), such as for example a movable piston, can be measured by aligning the member with a second position on the sonic wave guide, for example, by attaching the transducer 3 to the member. When the transducer is attached to a piston, the reciprocating motion of the piston causes the transducer and therefore the second position 18 to change accordingly. The distance between the first and second positions corresponds to the position of the member.

Advantageously, the sonic delay line 40 is of low cost and unsusceptible to wear & tear as the transducer is operable without contacting the sonic waveguide so that the sonic delay line has a long operating life. Furthermore, the displacement range of the sonic delay line is long and the response time is low, allowing for measurement of the position of fast moving members, such as pistons with fast stroke speeds. The sonic delay line is less complex and exhibits low hysteresis and high signal to noise ratio (SNR) than existing positions sensors.

Sonic wave generator 2 is adapted and arranged to generate sonic waves in the form of interrogation sonic wave 14 and excitation sonic waves 13, both of which propagate through the sonic wave guide 5 from the first position 17 to the second position 18 where transducer 3 actively converts the interrogation and excitation sonic waves to corresponding interrogation and excitation output signals 15, 21 respectively.

Transducer 3 is electrically connected to a self-powered transmitter 19 which is attached to or integrated with the transducer so that it can be easily mounted on the member together with the transducer. Transmitter 19 is configured to transmit a transmission signal 20, encoded with the interrogation electrical signal 15, via an antenna 8. A receiver 10, configured to receive transmission signal 20 via antenna 9, includes a demodulator for decoding the transmission signal 20 so as to detect the interrogation electrical signal 15 representing the sonic interrogation wave 14. Receiver 10 is electrically connected to signal conditioner 11 which, in turn, is connected to a driver 12 for driving the sonic wave generator 2. Also, operatively coupled to the sonic wave guide is a sonic damper 4 for suppressing the sonic waves 13, 14 propagating beyond the second position 18 so as to ensure high signal to noise ratio (SNR).

Transmitter 19 enables the interrogation signal to be wirelessly communicated to the signal conditioning circuitry 11 via receiver 10 so that hardware connections between the transducer and the conditioning circuitry are avoided. This is particularly useful applications in which the member whose position is being measured is moving at speed, like for example a piston, where hardware connections between the transducer and conditioning circuitry can be problematic. As a result, the sonic wave delay line 40 can be more easily integrated in existing applications.

As explained in more detail below, the signal conditioning circuitry 11 is adapted and arranged to determine the distance between the first and second positions 17,18 from the time delay between generator 2 generating the interrogation sonic wave 14 and receiver 10 detecting the interrogation signal 15 and to provide an analog or digital output signal representing this distance and therefore the position of the member.

In the apparatus of the illustrative embodiment shown in FIG. 1, the sonic wave guide is a stress sensitive ferromagnetic rod 5, such as an iron, ferrite and nickel rod, however, other magnetostrictive elements could be employed. Sonic wave generator 2 is a piezo-electric actuator, coupled to a distal end of the ferromagnetic rod 2, including a piezoelectric crystal which, upon application of a voltage to opposite sides thereof, causes a deformation to occur at the frequency of the applied voltage which, in turn, is converted into the sonic waves. Utilizing a piezo-electric actuator permits generation of the sonicwaves in a simple manner without providing additional current pulses in the sonicwave guide so that the sonic wave line can be made more compact and at a lower cost.

Figure 2:
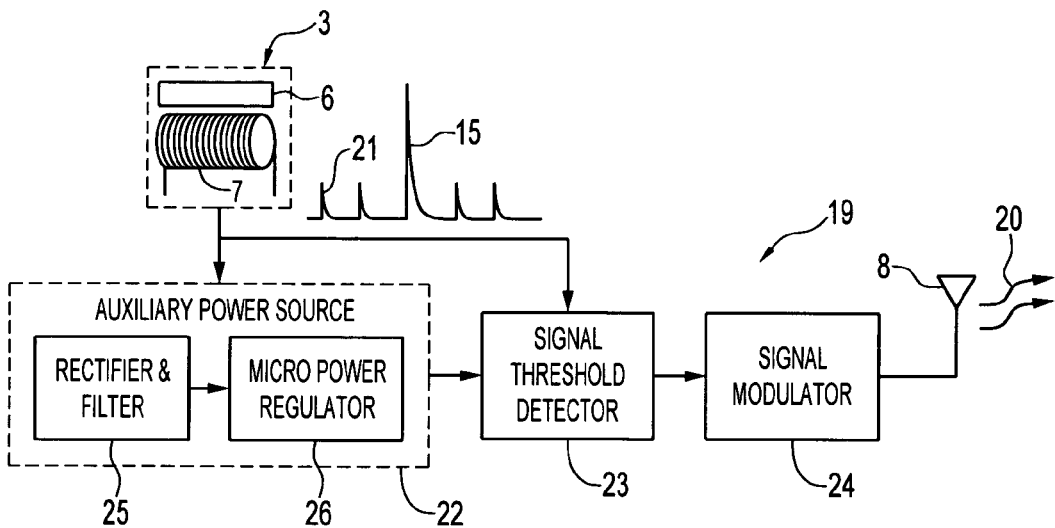
FIG. 2 illustrates a block diagram of the principle elements of the transducer and transmitter shown in FIG. 1.

Referring to FIG. 1, in conjunction with FIG. 2, which illustrates a block diagram of the principle components of the transducer and transmitter shown in FIG. 1, the sonic wave transducer 3 has a magnetic field source 6, such as for example, a biasing permanent magnet, for applying a magnetic field to the ferromagnetic rod 5, and a coil 7 which is arranged to detect a change in magnetic flux density in the rod 5 at the second position 18 caused by the sonic waves 13,14 inducing stress and, consequently, a change in permeability in the rod 5. In this particular embodiment, interrogation sonic wave 14 consists of a single sonic wave pulse and excitation sonic wave 13 consists of a plurality of sonic wave pulses having a fixed frequency and low amplitude relative to the interrogation pulse. Excitation and interrogation signals 21, 15 are therefore produced by the coil 7 in the form of electrical voltage pulses 21, 15 corresponding in frequency and amplitude to excitation and interrogation sonic wave pulses 13, 14, respectively. Excitation signals serve as power signals for powering circuitry as will be explained in more detail below.

As shown in FIG. 2, the transmitter 19 includes a signal threshold detector 23 which is arranged to detect the interrogation electrical pulse 15 provided by the coil 7 and trigger operation of the signal modulator 24 connected thereto. The modulator 24 generates an encoded electrical signal in response to interrogation pulse detected by signal threshold detector 23. The modulator also includes circuitry for modulating the interrogation electrical pulse 15 onto a carrier electrical signal so as to provide the transmission signal 20 encoded with the interrogation electrical signal.

An auxiliary power source 22, which is electrically coupled to the coil 7 and signal threshold detector 23, includes a rectifier and filter 25 for rectifying the excitation voltage pulses 21 produced by the coil 7 and a micro power regulator 26 for regulating the rectified pulses. The regulated voltage generated by the regulator 22 serves as an internal power supply voltage for the transmitter.

Advantageously, the excitation sonic waves are detected, rectified & filtered to obtain constant DC voltage to power up the electronics to modulate & transmit the interrogation signal so that the transmitter is effectively self-powered, without the need of local batteries or an external power supply, by converting the excitation sonic waves into electrical energy. Those skilled in the art would appreciate that the power signals from the transducer 3 may be used to power additional or alternative electronic devices other than the transmitter.

Figure 3:
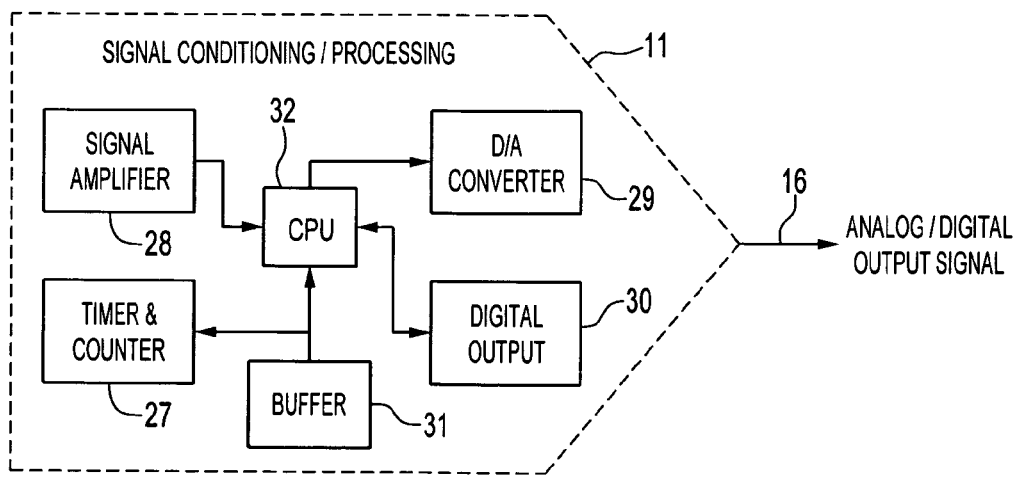
FIG. 3 illustrates a block diagram of the principle elements of the signal conditioner shown in FIG. 1.

Referring to FIG. 3, which illustrates a block diagram of the principle elements of the signal conditioning circuitry 11, the signal conditioning circuitry includes a CPU 32 which is configured to control a signal amplifier 28 for amplifying the interrogation signal 15 detected by the receiver, D/A converter 29, buffer 31 and digital output 30, and a timer 27 for measuring the time delay between generating the interrogation sonic wave 14 at the first position 17 and detecting the interrogation sonic wave at the second position 18. CPU 32 is operable to trigger a counter in the timer 27 in response to the piezo-actuator driver 12 generating the interrogation sonic wave 14 at the first position 17, and to stop the counter in response to the interrogation electrical signal 15 being detected at the receiver 10, which corresponds to the time delay between the interrogation sonic wave being generated and detected. Signal conditioner 11 determines the time delay and multiplies this by the propagation velocity of the sonic wave in the rod 5 so as to provide a digital or analog output 16 representing the distance between the first and second positions so that the position of the transducer and, therefore the member, can be determined.

A method 300 of measuring the position of a member according to one embodiment will now be described with reference to FIG. 4, which illustrates a flow-diagram outlining the steps of such a method. The method 300 can, for example, be implemented on the apparatus of the illustrative embodiment of FIG. 1.

Initially, a member whose position is to be measured is aligned with a sonic wave guide for guiding sonic waves from a first position to a second position. The member is aligned to the second position as indicated in step 301. In the apparatus of FIG. 1, the member can be aligned with the second position by simply attaching the transducer to the member. Thereafter, excitation and interrogation sonic waves are generated in the sonic wave guide as indicated in step 302 of FIG. 4. Method step 302 can be implemented in apparatus 1 of the embodiment of FIG. 1 by means of the piezo-electric actuator 2 generating the excitation sonic wave 13, which is in the form of low amplitude fixed frequency sonic pulses, and the interrogation sonic wave 14, which is in the form of a relatively higher amplitude interrogation sonic pulse.

In response to generating the interrogation sonic wave at the first position, a timer is enabled to start timing as indicated in step 303. Step 303 is performed by the signal conditioning circuitry 11 in the system of FIG. 1.

Thereafter, the interrogation and excitation sonic waves propagate on the sonic wave guide from the first position to the second position where they are then converted into interrogation and power signals, respectively, as indicated in steps 304, 305. Steps 304, 305 are implemented in the apparatus of FIG. 1 by means of transducer 3 and transmitter 19. The interrogation signal is then transmitted using the power signal, as indicated in steps 306. Method step 306 is implemented in the apparatus 1 of FIG. 1 by the power signal powering the transmitter 19 such that the signal modulator circuitry 24 can modulate the interrogation signal onto the a carrier signal and transmit the modulated signal 20 via antenna 8 to the receiver. (see FIG. 2).

As indicated in step 307, the transmitted modulated signal, encoded with the interrogation signal, is subsequently received and the interrogation signal, representing the interrogation sonic wave at the second position, is detected. In apparatus 1 of FIG. 1, the receiver detects the interrogation signal by demodulating the transmitted modulated carrier signal 20. In response, timing is stopped so as to determine the time delay between generating the interrogation sonic wave at the first position and detecting the interrogation sonic wave at the second position, as indicated in step 308. Method step 308 is performed in apparatus 1 by means of the signal conditioning circuit 11. The position of the member is then determined from the time delay value, as indicated in step 309. This step is achieved by multiplying the time delay by the propagation velocity of the sonic wave in the waveguide material so as to determine the linear distance between first position and the second position, i.e. the member. These latter steps are performed by the signal conditioning circuitry 11 in the system 1 of the illustrative embodiment of FIG. 1.

Figure 4:
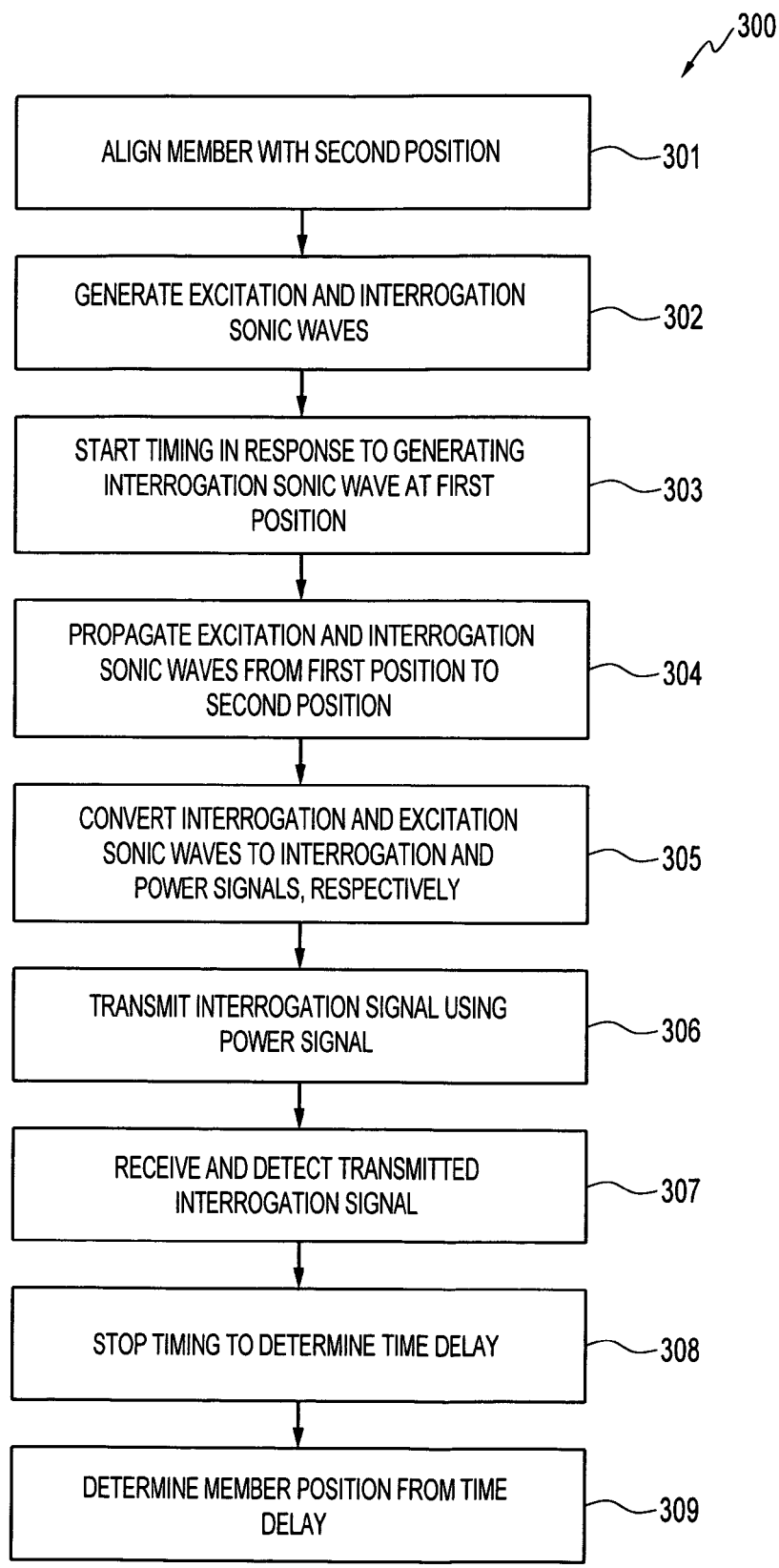
FIG. 4 illustrates a flow diagram outlining a method of measuring the position of a member according to a preferred embodiment.

Those skilled in the art would understand that the accompanying FIG. 4 is merely depicting an example of the method 300 and that the embodiments are not limited thereto. In the aforementioned method 300, an excitation sonic wave is generated and converted to a power signal for transmitting the interrogation signal. However, those skilled in the art would understand that the method could be implemented without the use of an excitation sonic wave to generate a power signal for transmitting the interrogation signal. For example, the power signal could be generated by providing a separate internal power supply, such as for example, batteries, or using an external power supply connected to a transmitter. Also, the power signal could be used for powering alternative or additional devices.

Figure 5:
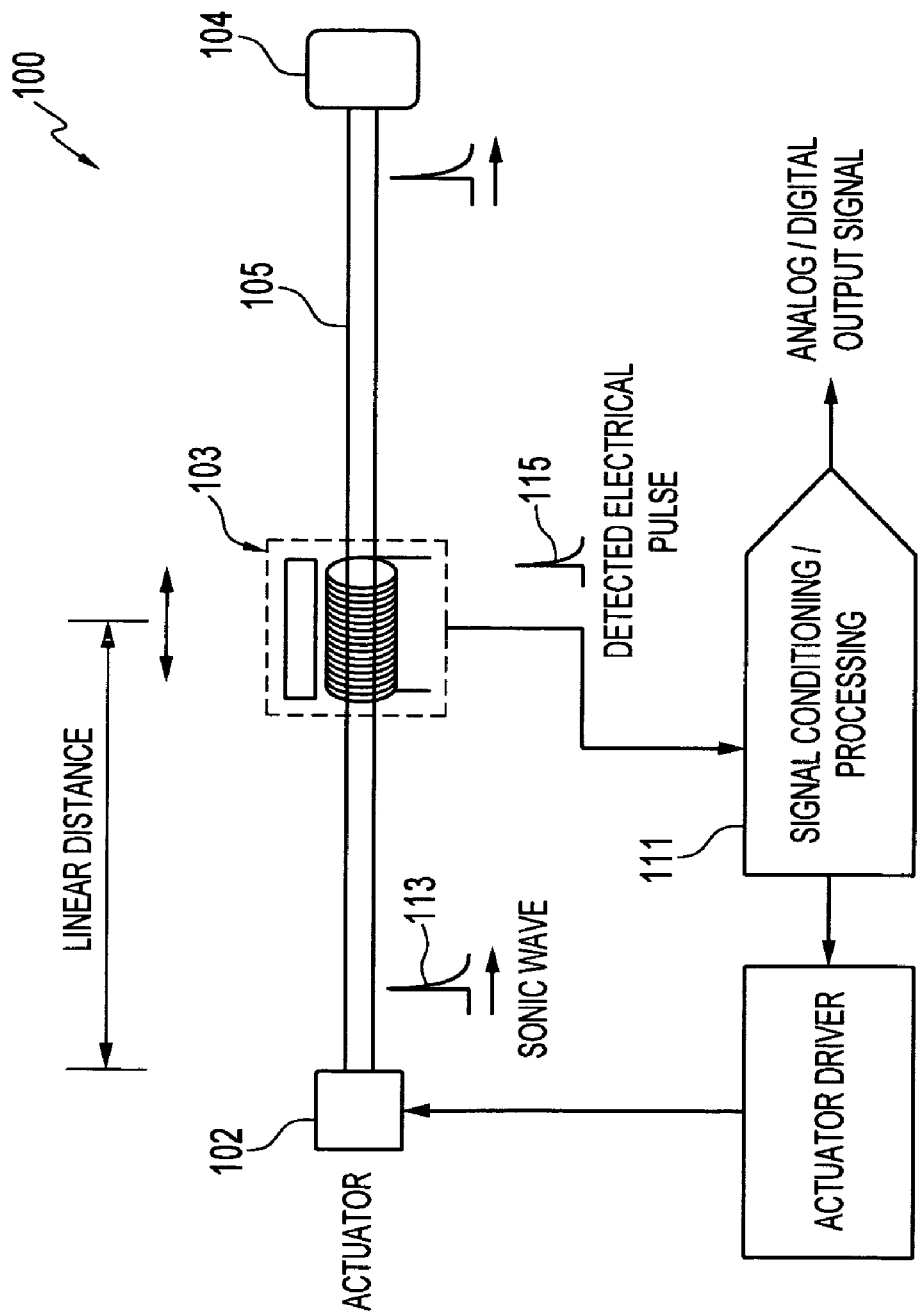
FIG. 5 illustrates a block diagram of an apparatus for measuring the position of a member according to another embodiment.

An apparatus for measuring the position of a member according to another embodiment is shown in FIG. 5 in block-diagram form. The apparatus 100 is identical to the apparatus 1 of the first embodiment shown in FIG. 1 with the exception that the transmitter and receiver are omitted and the transducer 103 is electrically connected to the signal conditioning circuitry. Also, actuator 102 is configured to generate an interrogation sonic wave 113 without an excitation sonic wave. Transducer 103 converts the interrogation sonic wave 113 into an electrical signal 115 for processing by signal conditioning circuitry 111. The propagation time delay and distance between the actuator 102 and transducer 103 is determined in the same way as in the first embodiment so as to determine the position of the member.

Apparatus 100 is advantageous over existing position sensors for the same reasons as apparatus 1. However, the simplicity of apparatus 100 enables it to be manufactured in a more compact form at even lower cost.

Figure 6:
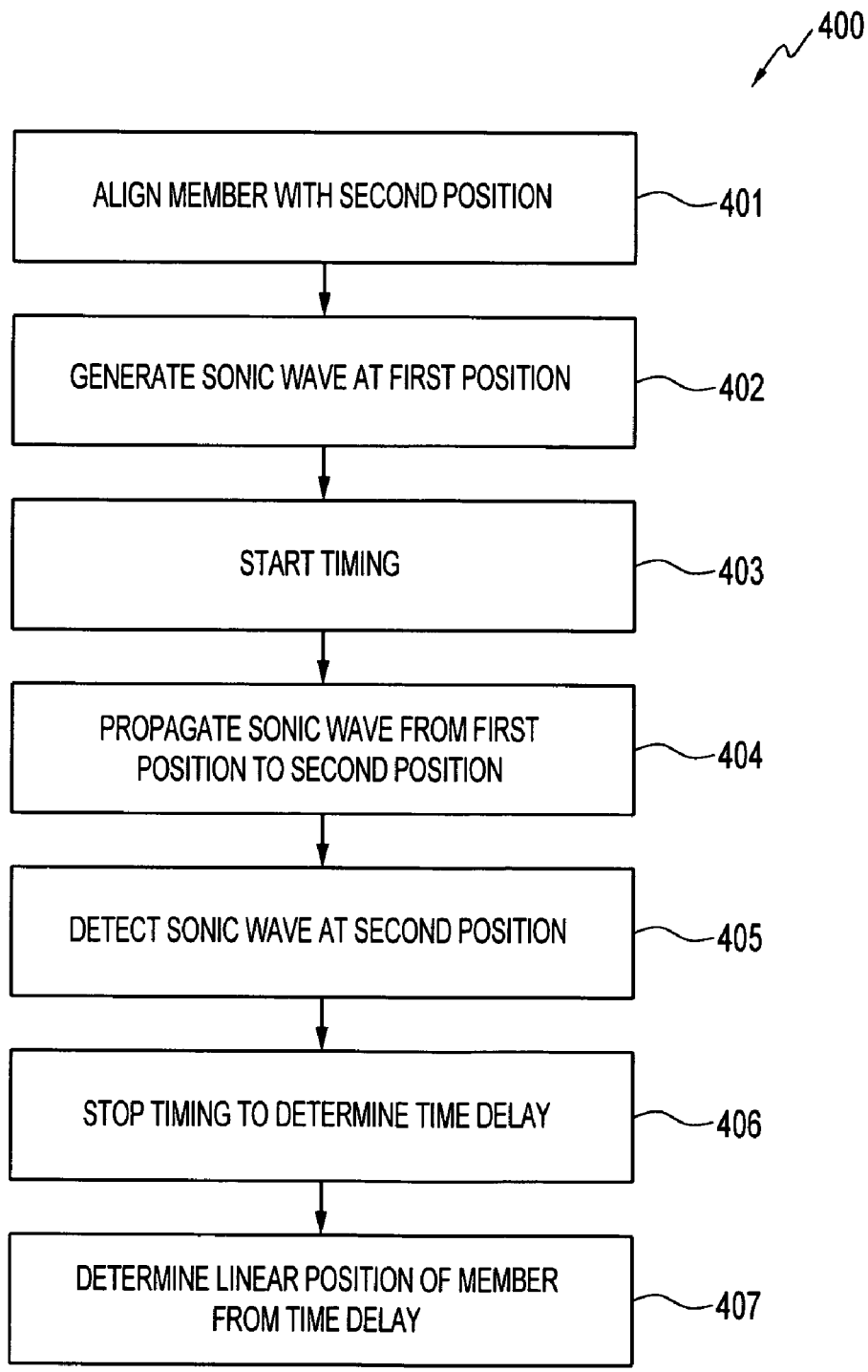
FIG. 6 illustrates a flow diagram outlining a method of measuring the position of a member according to another embodiment.

A method 400 of measuring the position of a member according to another embodiment is illustrated in the flow diagram of FIG. 6. The apparatus 100 of FIG. 5 is suitable for implementing the method outlined in FIG. 6. Initially, the member is aligned to a second position and a sonic wave is generated at the first position, as indicated in steps 401, 402. In response, timing is initiated, as indicated in steps 403. Thereafter, the interrogation sonic wave propagates from the first position to the second position and is detected at the second position (see steps 404, 405). In response, the timer is stopped to provide the time delay between generating and detecting the interrogation sonic wave (see step 406). The distance between the first position and second position, and therefore the member is determined from the timed delay (see step 407).

Figure 7:
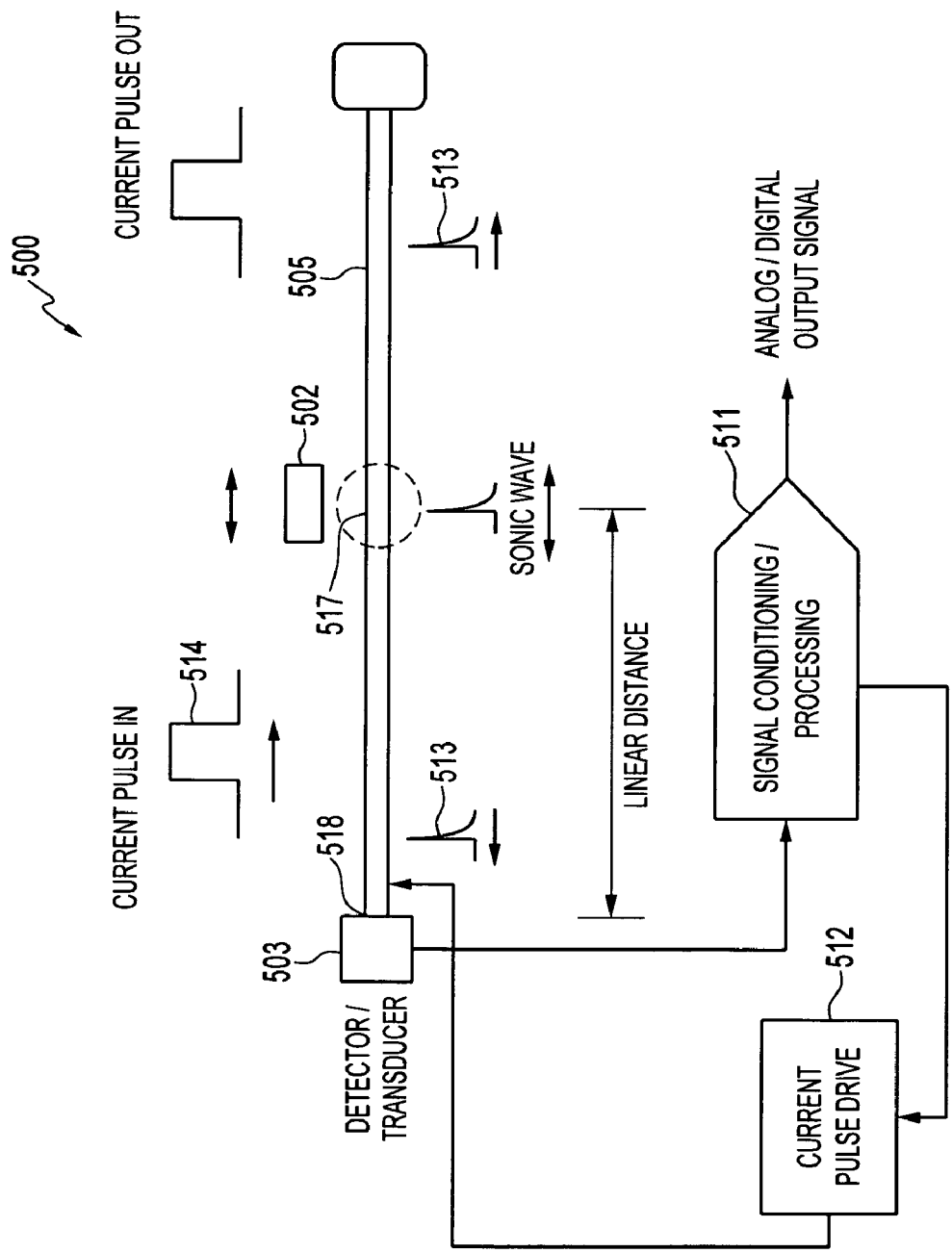
FIG. 7 illustrates a block diagram of an apparatus for measuring the position of a member according to yet another embodiment.

Referring now to FIG. 7, which illustrates a block diagram of an apparatus for measuring the position of a member according to yet another embodiment, apparatus 500 has a biasing magnetic field source 502 consisting of a permanent magnet operatively coupled to a first position 517 on a stress sensitive ferromagnetic rod 505, and a transducer 503 consisting of a piezo-electric detector operatively coupled to a second position 518, in this case the distal end of the rod 505, for detecting the sonic wave 513. A current pulse generator or driver 512, electrically connected to the sonic wave guide 505 and signal conditioning circuitry 511, is configured to generate an interrogation current pulse 514 propagating through the ferromagnetic rod 505 from the second position 518 to the first position 517.

The general circuitry of the signal conditioner 511 is similar in design to the signal conditioning circuitry 11 of the first embodiment shown in FIG. 2. However, in this particular embodiment, the signal circuitry is configured to trigger the current pulse generator 512 to generate the interrogation current pulse 514 and to start timing in response to generating the current pulse at the second position 518. The current pulse 514 propagates to the first position 517 of the rod where it interacts with the magnetic field applied by the magnet 502 causing the rod to twist so as to generate a sonic wave 513 which then propagates through the rod from the first position 517 to the second position 518 where it is detected by the piezo electric transducer 503. Since the time delay between generating the interrogation current pulse 514 at the second position 518 and detecting the generated sonic wave 513 at the second position 518 is proportional to the distance between the first and second positions, the time delay measured by the timer can be processed by the signal conditioning circuitry 511 to provide and an analog or digital output signal representing the linear distance.

The description as set forth is not intended to be exhaustive or to limit the scope of the invention. For example, those skilled in the art would understand that the apparatus of the illustrative embodiments disclosed herein may be employed for measuring the position of substances, materials or media rather than a piston or other member. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

Having thus described the invention what is claimed is:

1. A sonic delay line system for measuring the distance between positions on a sonic wave guide, said system comprising:

a generator, operatively coupled to said sonic wave guide, for generating at least one sonic wave at a first position in said sonic wave guide; and a non-contact transducer, operatively coupled to said sonic wave guide without contacting said sonic wave guide, for detecting at least one sonic wave at a second position in said sonic wave guide, wherein said sonic wave(s), generated at said first position by said generator, propagate through said sonic wave guide and are detected at said second position by said transducer after a time delay representing the distance between said first and second positions, wherein said transducer comprises a piezo-electric detector coupled to a distal end of said sonic wave guide.

2. The system of claim 1, further comprising a sonic damper, operatively coupled to said sonic wave guide, for suppressing the sonic waves propagating beyond the second position so as to ensure high signal to noise ratio (SNR).

3. The system of claim 1, wherein said generator comprises a piezo-electric actuator.

4. The system of claim 1, wherein said transducer comprises a biasing magnetic source for applying a magnetic field to said sonic wave guide at said second position and a coil for detecting a change in magnetic flux density at said second position caused by said sonic wave(s).

5. The system of claim 1, further comprising a timer, operatively coupled to said generator and transducer, said timer being enabled in response to said generator generating said sonic wave(s) and stopped in response to said transducer detecting said sonic wave(s) so as to determine said time delay.

6. The system of claim 1, wherein said sonic wave guide comprises a ferromagnetic rod.

7. The system of claim 1, wherein said sonic wave generator comprises a current pulse generator, operatively coupled to said sonic wave guide, for generating an interrogation current pulse in said sonic wave guide, and a position magnetic field source for applying a magnetic field to said sonic wave guide at said first position, and wherein, when said pulse generator generates a interrogation current pulse propagating through said sonic wave guide, said magnetic field interacts with said interrogation current pulse at said first position to generate said sonic wave(s).

8. The system of claim 7, further comprising a timer, operatively coupled to said current pulse generator and said sonic wave detector, said timer being adapted and arranged to start timing in response to said current pulse generator generating said interrogation current pulse and to stop timing in response to said detector detecting said sonic wave(s) so as to determine said time delay.

9. An apparatus for measuring the position of a member comprising:
a sonic waveguide;
a generator, operatively coupled to said sonic waveguide, wherein said generator is configured to generate an interrogation sonic wave and excitation sonic waves at a first position in said sonic wave guide;
a non-contact transducer operatively coupled to said sonic wave guide without contacting said sonic waveguide, wherein said transducer is attachable to said member and configured to convert said interrogation sonic wave at a second position in said sonic wave guide to an interrogation signal and to convert said excitation sonic waves at said second position to excitation signals;
a wireless transmitter, attachable to said transducer, wherein said wireless transmitter is configured to convert said excitation signals to a power signal to power said wireless transmitter to wirelessly transmit said interrogation signal;
and a timer, operatively coupled to said generator and said transducer, said timer being enabled in response to said generator generating said interrogation sonic wave and stopped in response to said transducer detecting said interrogation sonic wave so as to determine the propagation time delay of said interrogation sonic wave, wherein, when a member is attached to said transducer, the position of said member can be determined from the measurement of said propagation time delay.

10. The apparatus of claim 9, wherein said generator further comprises a sonic damper, operatively coupled to the sonic wave guide, for suppressing the sonic waves propagating beyond the second position so as to ensure high signal to noise ratio (SNR).

11. The apparatus of claim 9, wherein said wireless transmitter includes a modulator for generating a carrier signal and modulating said interrogation signal onto said carrier signal so as to provide a modulated transmission signal for wireless transmission thereof.

12. The apparatus of claim 9, wherein said excitation sonic waves comprise a series of sonic pulses having a fixed carrier frequency and/or amplitude.

13. The apparatus of claim 9, wherein said transducer comprises a biasing magnetic source for applying a magnetic field to said sonic wave guide at said second position and a coil for detecting a change in magnetic flux density at said second position caused by said sonic waves; and
wherein said wireless transmitter includes an auxiliary power source having a rectifier for rectifying excitation voltage signals received from said coil and a regulator for regulating rectified voltage signals to thereby provide an internal power supply voltage for said transmitter.

14. The apparatus of claim 13, further comprising a wireless receiver for receiving said transmitted interrogation signal, said timer being connected to said receiver such that said timer is stopped in response to said receiver receiving said transmitted interrogation signal.

15. A method for measuring the position of a member comprising:
aligning a member to a first position or second position on a sonic wave guide;
generating an interrogation sonic wave;
propagating said interrogation sonic wave through said sonic wave guide from said first position to said second position;
providing a non-contact transducer operatively coupled to said sonic wave guide without contacting said sonic waveguide;
detecting said interrogation sonic wave at said second position with said non-contact transducer;
determining the time delay between generating and detecting said sonic wave; and
determining the position of said member from said time delay;
generating an excitation sonic wave;
propagating an excitation sonic wave through said sonic wave guide from said first position to said second position;
detecting said excitation sonic wave at said second position;
converting said detected excitation sonic wave into a power signal;
converting said interrogation sonic wave at said second position into a transmission signal;
wireless transmitting a signal representing said detected interrogation sonic wave using said power signal;
and wherein stopping said timer in response to detecting said interrogation sonic wave comprises stopping said timer in response to detecting said wirelessly transmitted signal representing said interrogation sonic wave.

16. The method of claim 15, further comprising attaching said non-contact transducer to said member.

17. The method of claim 15, wherein determining said time delay comprises enabling a timer in response to generating said sonic wave and stopping said timer in response to detecting said interrogation sonic wave.

18. The method of claim 17, further comprising operatively coupling a sonic damper to the sonic wave guide, and suppressing sonic waves propagating beyond the second position so as to ensure high signal to noise ratio (SNR).

* * * * *